Feb. 2, 1960            R. R. ANNIS            2,923,873
MULTI-SPEED SALIENT POLE UNIVERSAL MOTOR WITH SPLIT-WOUND FIELD
Filed Sept. 5, 1958
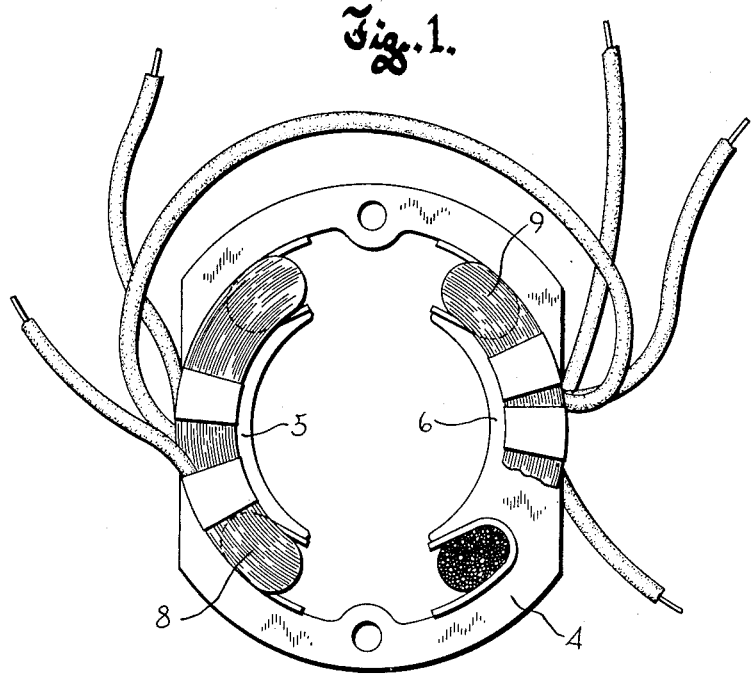
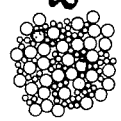
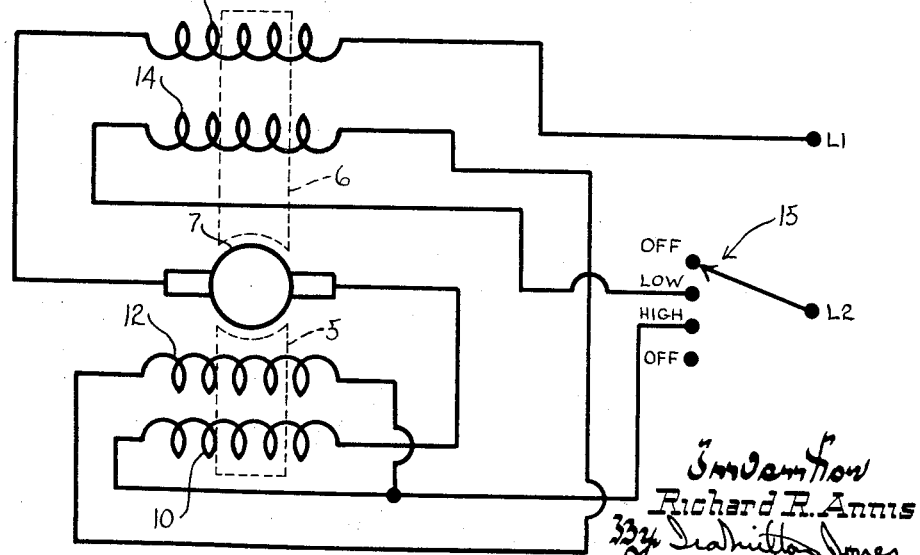

United States Patent Office 2,923,873
Patented Feb. 2, 1960

2,923,873

MULTI-SPEED SALIENT POLE UNIVERSAL MOTOR WITH SPLIT-WOUND FIELD

Richard R. Annis, Milwaukee, Wis., assignor to John Oster Manufacturing Co., Milwaukee, Wis., a corporation of Wisconsin Application September 5, 1958, Serial No. 759,282

2 Claims. (Cl. 318—354)

This invention relates to electric motors and refers particularly to multi-speed salient pole universal motors having split-wound fields.

The purpose of this invention is to provide a motor of the character described which is capable of safely handling greater current at continuous full load operation than comparable motors heretofore available. In short, the invention has as its purpose to permit a higher rating for a given motor size and a given amount of copper and iron than was heretofore possible.

As will be explained hereinafter, the invention achieves its objectives through a new arrangement of the field coils by which the generated heat is always distributed throughout all of the windings of the field to thereby greatly improve the heat transfer coefficient of the motor and assure rapid dissipation of the heat.

To illustrate the improvement which this invention has achieved in motors of this kind, a nominally one-third horsepower motor embodying this invention, and which for purposes of identification may be considered motor A, was found by test able to carry 4.85 amperes on continuous operation with only a 49.1° C. temperature rise (measured by the thermocouple method), and delivered .38 horsepower; whereas previously and without the benefit of this invention, the same size motor overheated at low speed, was able to carry only 3.4 amperes on continuous operation and delivered .30 horsepower.

For another size motor, identified as motor B, the application of this invention safely handled 5.0 amperes with only a 55° C. temperature rise on continuous operation, whereas prior to this invention the same size motor could be given only a 3.4 ampere rating on continuous load. In this case, the horsepower comparison between the new and the old was .465 for the motor embodying this invention, and .27 for the prior motor. Both motors had the same amount of copper and iron.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed according to the best mode so far devised for the practical application of the principles thereof, and in which:

Figure 1 is an end view of the field assembly of a motor embodying this invention with a part thereof broken away and in section;

Figure 2 is a fragmentary detail view illustrating upon a greatly enlarged scale, a cross section through one of the field windings; and Figure 3 is a schematic diagram of one embodiment of this invention.

The motor of this invention may have a conventional frame and a conventional armature, and hence these elements have not been illustrated. The invention concerns only the field assembly of the motor which, as shown in Figure 1, includes a stack of laminations 4, shaped to provide at least two salient poles 5 and 6. A two-pole field has been chosen for illustration because of its simplicity, but it should be understood that the motor may have any even number of poles. Also for the sake of simplicity, the motor illustrated in the drawings has only two speeds—high and low.

The salient poles, of course, concentrically receive the armature, not shown except schematically in Figure 3 where it is designated by the numeral 7, and the field windings 8 and 9 are applied to the poles, either as previously wound coils or by winding them directly on the poles, preferably by machine.

For each speed at which the motor is to operate (two in the motor illustrated) the field winding is distributed equally over the number of poles. The entire winding for the highest speed is of the same gage wire, but for the lower speeds the winding includes all of the high speed winding plus additional turns of finer gage wire; but on each pole the number of turns of all wire gages is the same.

Moreover, the turns about each pole are scramble-wound with the turns of one gage wire randomly arranged with the turns of the other gage wire.

For purposes of illustration and with specific reference to Figure 3, the high speed winding comprises a section 10 wound about the pole 8 and a like section 11 wound about the pole 9. Together, these two sections constitute the high speed winding which, again for purposes of illustration, may be of No. 21 wire. Both sections have the same number of turns.

The low speed winding of the illustrated motor comprises in addition to the sections 10 and 11, two other sections 12 and 14 respectively wound about the poles 8 and 9. These two sections 12 and 14 have the same number of turns as the sections 10 and 11 of the high speed winding, and are of the same gage wire. The wire gage of the sections 12 and 14 may be the same as that used for the sections 10 and 11, but to gain greater resistance and thus make possible a wider differential between the high and low speeds, it is preferable to use a finer gage wire for the sections 12 and 14, as for instance, No. 26.

These four winding sections are so connected with one another and with the brushes of the armature 7, and with a speed selector switch 15, that by selective actuation of this switch, the field windings may be connected across the line to obtain either high or low speed operation. Thus, if the switch is moved to its high speed position, only the sections 10 and 11, which together comprise the high speed winding, will be in circuit; whereas, when the switch is moved to its low speed position, the sections 12 and 14 are included to provide the low speed winding.

The important and significant fact, however, is that whether the motor is operating at high speed or low speed, the field winding producing the selected speed is equally distributed over the poles.

As indicated hereinbefore, the number of turns of the different gage wires used is the same at all poles. Thus, for purposes of illustration, assuming that as there were in the motor hereinbefore identified as motor B, there are 110 turns of number 21 wire in section 10, there are then also 110 turns of number 26 wire in section 12, and of course the same holds true for the sections 11 and 14. Both wires are applied or wound onto each pole simultaneously. Not only are both wires applied at the same time, but the winding thereof is done by the so-called scramble method, which results in the different gage wires being randomly arranged with respect to one another, as depicted in Figure 2.

Scramble winding with its resulting random arrangement of the different gage wires, has a marked advantage from the standpoint of cooling efficiency. It places the wires of both windings in good conductive engagement with one another and thus distributes the generated heat over the entire field. Accordingly, at high speed when only the winding sections 10 and 11 are in circuit, the heat is efficiently conducted to the winding sections 12 and 14, so that the wire in these sections in effect provides extended surface to assure more rapid heat dissipation. Also, by virtue of this simultaneous scramble winding of the sections 10 and 12 onto the pole 5, and sections 11 and 14 onto pole 6, better cooling of the windings is obtained. This results from the unlikelihood of there being hot spots shielded from the cooling air circulated over the field windings by the cooling fan of the motor, not shown, such as would result if the different gage wires were separately neatly and uniformly laid in such regular order, that practically no air could circulate through the windings.

With a view toward achieving optimum cooling, it is also preferable that the winding sections be applied to their respective poles by winding the same directly thereon, preferably by machine, as distinguished from first forming the winding sections into shaped coils, since this latter practice generally entails taping the coils which, of course, would make it impossible for cooling air to flow through the coils.

From the foregoing description, taken in connection with the accompanying drawing, it should be readily apparent to those skilled in this art, that this invention achieves a marked improvement and has many advantages over prior multi-speed salient pole, universal motors, not least among which is economy of material, since the invention allows the motor size to be reduced for a given horsepower, and, of course, as a corollary, if the size is not reduced its output is materially stepped up by this invention.

It should also be apparent to those skilled in the art, that where more than two speeds are desired, an appropriate increase in the number of field windings, equally distributed over the total number of poles, and preferably of different gage wire, would be required; and while absolute equality in the distribution of the field windings, i.e., exactly the same number of turns of the wires on all the poles assures best results, such deviation from this optimum condition which does not produce objectionable unbalance may be tolerated. Hence, where reference is made herein to the distribution of the windings over the poles, it should be understood that substantially equal distribution is intended.

What is claimed as my invention is:

1. A multi-speed salient pole universal motor having a split wound field and an even number of poles, characterized by the fact that for each speed at which the motor is to operate the field winding differs in length from that of the other speed winding or windings; by the fact that the field winding for each speed is distributed substantially equally between the total number of poles; by the fact that the entire winding for the highest speed is of the same gage wire; by the fact that for any speed other than the highest speed the wiring includes all of the high speed winding plus additional turns of finer gage wire; by the fact that on each pole the number of turns of each wire gage is the same; and by the fact that the turns about each pole are scramble-wounded with the turns of one gage wire randomly arranged with those of the other gage wire.

2. In a multi-speed, salient pole universal motor having a split wound field and an even number of poles: a high speed winding divided into sections, one for each pole of the motor, with substantially the same number of turns in each section; another winding also divided into sections, one for each pole, and also having substantially the same number of turns in each of its sections; the total number of turns in each of said windings being substantially the same; each pole having the turns of its high speed winding section scramble-wound with the turns of its other winding section to randomly dispose the turns of one of said sections with those of the other; and means for selectively connecting only the high speed winding with a source of voltage for high speed operation of the motor, and for connecting the high speed winding and said other winding in series with said voltage source for lower speed operation of the motor.

References Cited in the file of this patent

UNITED STATES PATENTS

| | | |
|---|---|---|
| 1,186,658 | Haschke | June 13, 1916 |
| 2,554,506 | Schwarz | May 27, 1951 |

UNITED STATES PATENT OFFICE
CERTIFICATE OF CORRECTION

February 2, 1960

Patent No. 2,923,873

Richard R. Annis

It is hereby certified that error appears in the printed specification of the above numbered patent requiring correction and that the said Letters Patent should read as corrected below.

Column 2, line 67, the numerals "110" and "21" should not be printed in bold face type; line 68, the numerals "110" and "26" should not be printed in bold face type; column 4, line 23, for "wounded" read -- wound --.

Signed and sealed this 19th day of July 1960.

(SEAL)
Attest:

KARL H. AXLINE
Attesting Officer

ROBERT C. WATSON
Commissioner of Patents